US008250073B2

(12) United States Patent
Wong

(10) Patent No.: US 8,250,073 B2
(45) Date of Patent: Aug. 21, 2012

(54) PREPARING AND PRESENTING CONTENT

(75) Inventor: Wee Ling Wong, Altadena, CA (US)

(73) Assignee: University of Southern California, Los Angeles, CA (US)

( * ) Notice: Subject to any disclaimer, the term of this patent is extended or adjusted under 35 U.S.C. 154(b) by 2782 days.

(21) Appl. No.: 10/427,699

(22) Filed: Apr. 30, 2003

(65) Prior Publication Data

US 2003/0229616 A1 Dec. 11, 2003

Related U.S. Application Data

(60) Provisional application No. 60/377,151, filed on Apr. 30, 2002.

(51) Int. Cl.
G06F 7/00 (2006.01)
G06F 17/30 (2006.01)

(52) U.S. Cl. ........................................ 707/736
(58) Field of Classification Search ................ 707/10, 707/104.1, 101, 102; 725/135, 61; 348/426.1; 715/721

See application file for complete search history.

(56) References Cited

U.S. PATENT DOCUMENTS

| | | | |
|---|---|---|---|
| 5,721,815 A * | 2/1998 | Ottesen et al. ............ | 715/721 |
| 5,903,902 A | 5/1999 | Orr et al. | |
| 5,956,737 A | 9/1999 | King et al. | |
| 6,037,943 A | 3/2000 | Crone et al. | |
| 6,081,262 A | 6/2000 | Gill et al. | |
| 6,154,600 A | 11/2000 | Newman et al. | |
| 6,154,771 A | 11/2000 | Rangan et al. | |
| 6,155,840 A | 12/2000 | Sallette | |
| 6,166,735 A | 12/2000 | Dom et al. | |
| 6,278,446 B1 * | 8/2001 | Liou et al. ............ | 715/700 |
| 6,360,234 B2 * | 3/2002 | Jain et al. ............ | 715/500.1 |
| 6,615,039 B1 * | 9/2003 | Eldering ............ | 455/418 |
| 2001/0020981 A1 * | 9/2001 | Jun et al. ............ | 348/426.1 |
| 2002/0069218 A1 | 6/2002 | Sull et al. | |
| 2002/0175932 A1 * | 11/2002 | Yu et al. ............ | 345/720 |
| 2003/0097661 A1 * | 5/2003 | Li et al. ............ | 725/109 |
| 2003/0122924 A1 * | 7/2003 | Meyers ............ | 348/14.11 |
| 2003/0177503 A1 * | 9/2003 | Sull et al. ............ | 725/112 |
| 2004/0125124 A1 * | 7/2004 | Kim et al. ............ | 345/716 |
| 2004/0126021 A1 | 7/2004 | Sull et al. | |
| 2004/0128317 A1 | 7/2004 | Sull et al. | |
| 2005/0193425 A1 * | 9/2005 | Sull et al. ............ | 725/135 |

OTHER PUBLICATIONS

Lippman, "The Distributed Media Bank", Community Networking Integrated Multimedia Services to the Home, 1994., Proceedings of the 1st International Workshop on Jul. 13-14, 1994 pp. 99-106.*
Guzik et al., "Controlling a High Definition Broadcast Television Studio Using Distributed Software Objects", International Broadcasting Convention, Sep. 12-16, 1997, Conference Publication No. 447, pp. 154-159.*
Online Training Solutions Inc., "Microsoft® Windows® XP Step by Step", Chapter 5, Sep. 26, 2001. Accessed at http://www.microsoft.com/mspress/books/sampchap/5207e.asp.*
Storyboarding Multimedia, Adrian Mallon, 1995.

* cited by examiner

*Primary Examiner* — Michael Hicks
(74) *Attorney, Agent, or Firm* — Fish & Richardson P.C.

(57) ABSTRACT

Systems and techniques to prepare and present content. In general, in one implementation, a technique includes receiving information identifying a first streaming content element describing a first scope of material, receiving information identifying a second streaming content element describing a second scope of material, and describing a presentation including the first streaming content element and the second streaming content element in a parent/child relationship. The second scope of material can be more detailed than the first scope and included in the first scope.

21 Claims, 7 Drawing Sheets

| Activation of B-Lymphocytes |
| Allele |
| Antibody |
| Antibody Production and Release |
| Bacterium |
| Beadle and Tatum |
| Cell Wall |
| Chromosome Structure |
| ... |
| Transcription and Translation Theory |
| Zygotes |

PREPARING AND PRESENTING CONTENT

This application claims the benefit of U.S. Provisional Application No. 60/377,151 filed Apr. 30, 2002.

STATEMENT AS TO FEDERALLY SPONSORED RESEARCH

This invention was made with government support under Contract No. 9529152 awarded by the National Science Foundation. The government has certain rights in the invention.

BACKGROUND

This description relates to preparing content for presentation, as well as to presenting content.

Various computer programs allow a user to prepare and/or present audio, graphic, video, and/or text content. For example, MICROSOFT POWERPOINT allows a user to prepare audio, text, graphic, and video content in a local presentation file that includes a series of discrete "slides."

SUMMARY

The present application describes systems and techniques relating to the preparation of content for presentation, as well as presenting content.

In general, in one implementation, a method includes receiving information identifying a first streaming content element describing a first scope of material, receiving information identifying a second streaming content element describing a second scope of material, and describing a presentation including the first streaming content element and the second streaming content element in a parent/child relationship. The second scope of material can be more detailed than the first scope and included in the first scope.

This and other implementations may include one or more of the following features. Information identifying a third streaming content element to be included in the description of the presentation can be received. The third streaming content element can regard a third scope of material not included in the first scope. The third streaming content element can be added to the description of the presentation in sequence with the first streaming content element or with the third streaming content element and the second streaming content element in a second parent/child relationship. The parent/child relationship between the first streaming content element and the second streaming content element can be ended.

The description of the presentation can be relayed to a data processing device independently of the first streaming content element and the second streaming content element. The presentation can be described by establishing the parent/child relationship based on the receipt of the information identifying the first and the second streaming content elements before receipt of information identifying a third streaming content element. The information identifying the first streaming content element can be a user input new designation of the first streaming content element. The information identifying the first streaming content element can include information identifying a transcript to supplement the first streaming content element. The first streaming content element can be an educational streaming content element.

Information identifying the first streaming content element can be received by displaying a collection of content elements to a user and receiving user input indicating the first streaming content element in the collection of content elements. The presentation can be described by establishing a data file that includes the information identifying the first streaming content element in association with the information identifying the second streaming content element.

In another implementation, an article includes a machine-readable medium storing instructions operable to cause one or more machines to perform operations. The operations can include receiving a presentation description identifying two separate streaming content elements and a presentation sequence of the two elements, receiving the two separate streaming content elements from one or more remote locations, and rendering the two separate streaming content elements in the presentation sequence without prompting from a user.

This and other implementations may include one or more of the following features. The two separate streaming content elements can be rendered in the presentation sequence by rendering the second of the two streaming content elements immediately after conclusion of the first of the two streaming content elements. The received presentation description can identify a third streaming content element. The third streaming content element can be a child of the first of the two streaming content elements. The two separate streaming content elements can be rendered in the presentation sequence by rendering the two separate streaming content elements in the presentation sequence without rendering the third streaming content element.

The operations can include receiving a user selection of the third content element while rendering the first of the two streaming content elements and rendering the third content element prior to rendering the second of the two streaming content elements. A file identifying the two separate streaming content elements by name and identifying the presentation sequence of the two elements by the sequence of the names in the file can be received as the presentation description. A text supplement of the two streaming content elements, such as a transcript of one of the two streaming content elements, can also be rendered.

In another implementation, an article includes a machine-readable medium storing instructions operable to cause one or more machines to perform operations. The operations can include receiving a description of a hierarchical presentation describing a collection of streaming content elements potentially to be displayed during a rendition of the presentation, determining whether or not to render a first streaming content element in the collection, and receiving and rendering the first streaming content element only when it is determined that a rendition of the first streaming content element is desirable.

This and other implementations may include one or more of the following features. A user-readable translation of the description of the presentation can be provided to a user. User interaction with the user-readable translation can be used to determine whether or not to render the first streaming content element. Information identifying a remote streaming content element can be received. Receiving the description of the presentation can include receiving the description of the presentation from a first remote data processing machine and receiving information identifying the remote streaming content element at a second remote data processing machine.

User input selecting the first streaming content element or user input bypassing the first streaming content element can be received to determine whether or not to render the first streaming content element. Alternatively, determining whether or not to render the first streaming content element can include identifying the first streaming content element as a parent content element or as a child content element in the hierarchical presentation. For example, a parent streaming content element can be rendered after a rendition of a prior content element. User input indicating a child first streaming content element can be received to determine whether or not to render the first streaming content element. For example, in one implementation, the child first streaming content element need be rendered only upon receipt of the user input indicating the child first streaming content element.

The operations can include receiving a description of a transcript supplementing one streaming content element from the collection. A description of an educational lesson or a description of a sales pitch can be received.

The described systems and techniques can be implemented to realize one or more of the following advantages. Presentation content can be easily and quickly prepared for presentation and presented using the described systems and techniques. For example, a user can identify various types of content elements and arrange them in a presentation that is uniquely adapted to the user's desires. As another example, an existing presentation can be edited by a user to adapt the presentation to the user's desires. Such presentations can be structured as the user wishes and the sequence of content elements in the presentation can readily be changed—all without significant user expertise in computer programming or other techniques.

The content elements constituting such a presentation can be accessed from a remote data storage device, reducing the need for local data storage. Moreover, when a user is rendering a presentation, the content elements in the presentation can be selected individually or piecewise for rendition, minimizing the need for data transfer of undesirable content elements. This reduces the total time needed to render a presentation which is often critical in time sensitive situations such as sales presentations or presentations to students. Also, discrete streaming content elements can be seamlessly presented in accordance with a predefined structure of a presentation, reducing the need for user input during rendition of a presentation.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The described systems and techniques relate to the presentation of content and the preparation of instructions for presenting content in a data processing environment. Content can be audio, graphic, video, and/or text peculiarities that are presented by execution of machine-readable instructions. For example, content can describe a specific set of sounds to be played by execution of a set of machine-readable instructions for playing sound, or a specific sequence of images to be displayed by execution of a set of machine-readable instructions for displaying sequences of images.

Figure 1:
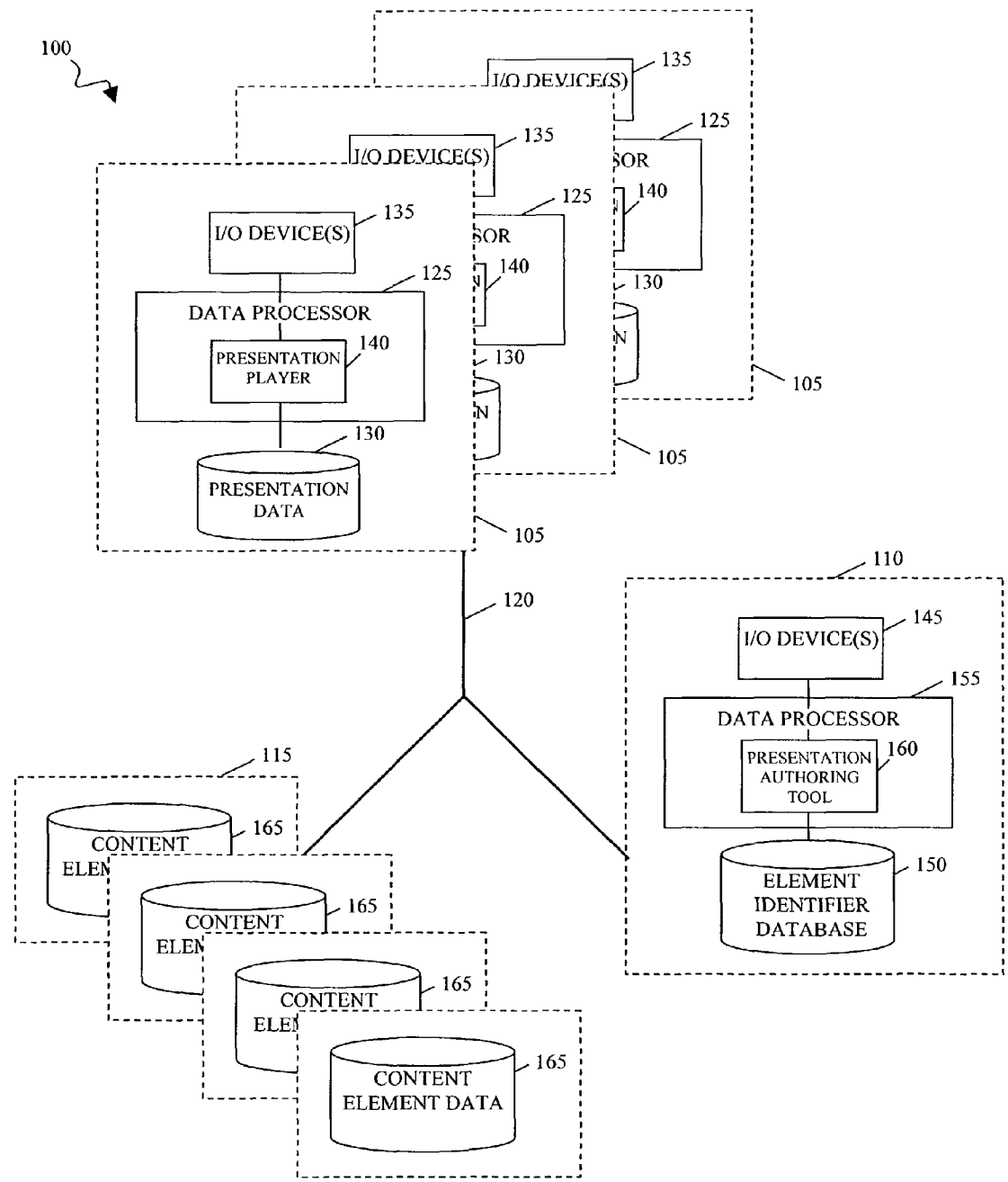
FIG. 1 shows an example data processing environment.

A data processing environment includes one or more data processing devices and/or data processing systems. FIG. 1 shows an example data processing environment 100. Environment 100 includes one or more presentation machines 105, an authoring machine 110, one or more content element repositories 115, and a data link 120. Data is communicated between presentation machines 105, authoring machine 110, and content element repositories 115 over data link 120 even if machines 105, 110, and content element repositories 115 are physically discrete devices that are remote from one another. For example, data link 120 may allow descriptions of presentations to be communicated from a single authoring machine 110 to multiple presentation machines 105 at different locations. As another example, data link 120 may allow a presentation machine 105 to access content stored remotely on multiple content element repositories 115 at different locations. Data link 120 can be any channel such as the Internet, or any network or wireless band.

Presentation machine 105 can include a data processor 125, a data storage device 130 that stores presentation data, and one or more input/output devices 135. Data processor 125 can be a data processing device and/or software that performs processing activities in accordance with the logic of a set of machine-readable instructions. For example, data processor 125 can perform processing activities that result in a presentation player 140. Presentation player 140 can interpret a description of a presentation and receive elements of the presentation, including remote content elements, to generate instructions for rendering the presentation to a user. The machine-readable instructions can be compiled or uncompiled computer code and can be implemented in a high-level procedural and/or object-oriented programming language, and/or in assembly/machine language.

Data storage device 130 can store a library of descriptions of presentations. A description of a presentation can include information that identifies the memory location of content elements that form the presentation. Input/output devices 135 can provide for interaction with a user. Input/output devices 135 can render a presentation for the user, e.g., by playing audio content and/or displaying video, graphic, or text content. Input/output devices 135 can include a visual display device (such as a cathode ray tube or liquid crystal display monitor), a sound-generating device (such as a speaker), a keyboard, and/or a pointing device such as a mouse or a trackball.

Authoring machine 110 can include a data processor 155, an element identifier database 150, and one or more input/output devices 145. Data processor 155 can be a data processing device and/or software that performs processing activities that result in a presentation authoring tool 160. Presentation authoring tool 160 can interpret user input to form a machine-readable description of a presentation. Presentation authoring tool 160 can store a resultant description of a presentation at a data storage device such as the data storage device that stores element identifier database 150. Presentation authoring tool 160 can also relay a resultant description of a presentation to machines that can interpret the resultant description of a presentation. For example, presentation authoring tool 160 can relay a description of a presentation to one or more presentation machines 105 over data link 120 for storage at data storage device 130.

Element identifier database 150 is a library of information that identifies potential content elements of presentations. Content elements are distinct machine-readable representations of information. For example, each content element can describe a particular topic or section in a presentation. The scope and duration of a content element can vary. For example, a first content element may provide basic information regarding a broad scope of the subject matter being presented, and a second content element may provide more detailed information regarding a narrow scope of the subject matter. Each of the content elements may be streaming content.

Content elements can potentially describe the peculiarities of a portion of a presentation. The use of a content element in forming a presentation can be controlled by the user. The user can select the desirability of the content element, a sequence of desirable content elements, and an organizational arrangement of the desirable content elements in a presentation structure. For example, in a presentation organized in a hierarchical structure, a content element with a relatively narrow or detailed topic scope can serve as a child subelement of a content element with a broader or less detailed scope.

The information in element identifier database 150 that identifies content elements can include the names, descriptions, and/or memory locations of potential content elements. The memory locations of content elements can be local or remote. For example, the memory location of a content element can be in authoring machine 110 (not shown) or elsewhere in data processing environment, such as at a presentation element repository 115. Input/output devices 145 can provide for interaction with a user such as receiving input for assembling a machine-readable description of a presentation from the user. The received input can indicate content elements, and the sequence of the indicated content elements, in the described presentation.

Content element repositories 115 can be database systems that can communicate over data link 120 and include a content element database 165. Content element database 165 can store various content elements suitable for inclusion in the presentation. For example, content element database 165 can include streaming content elements. Streaming content, such as streaming video and/or streaming audio, can be rendered as the content arrives at the rendering data processing device, that is, without storing the entire file representing the content in advance. For example, streaming audio content can be received in a continuous stream that is played for a user as the audio content arrives at a data processing device. As another example, the transmission of a streaming video content element from a storage database (such as content element database 165) to a rendering device (such as a presentation machine 105) can be commenced. After a buffer that includes a suitable portion of the content element has already arrived at the rendering device, the rendering device can commence rendition of the content element while the remainder of the content element is still arriving.

Streaming content can be a sequence of images. Streaming content can include streaming video content and streaming audio content. Streaming content can be transmitted in compressed format, such as, e.g., in MPEG-4, in any other MPEG format, or in a proprietary format. Streaming content can be rendered by a player such as REALSYSTEM G2 or MICROSOFT WINDOWS MEDIA TECHNOLOGIES. The player (such as presentation player 140) can include a codec that can decompress the streaming content and generate video data suitable for display on a video display device and audio data suitable for playing on a speaker.

Content element database 165 can also store transcripts associated with various content elements. As used herein, a transcript is text content that supplements another content element. For example, a transcript can supplement an audio streaming content element by including a text record of a narration of the audio element. Such transcripts can provide information regarding the spelling of narrated words, and further can allow even hearing disabled users or users with limited hardware to benefit from rendition of content.

Figures 2, 3:
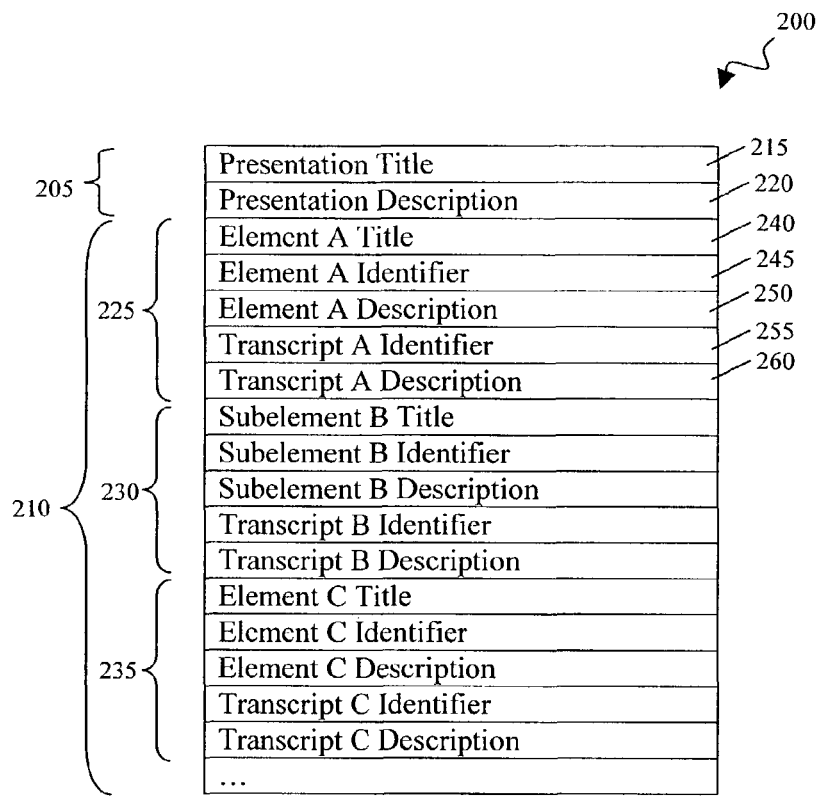
FIG. 2 shows an example machine-readable description of a presentation.
FIG. 3 shows an example presentation library.

FIG. 2 shows an example machine-readable description of a presentation 200. Presentation description 200 can be stored in association with a collection of other presentation descriptions at a data storage device associated with, e.g., a presentation machine or an authoring machine, such as machines 105, 110 of FIG. 1. Presentation description 200 can be a discrete file or a component of another file. For example, presentation description can be a text file that stores information in a flat file data structure.

Presentation description 200 includes both data related to the presentation 205 and data related to the content elements of the presentation 210. Data related to the presentation 205 can include a title of the presentation 215 and a description of one or more characteristics of the presentation 220. The description of presentation characteristics 220 can include the name of the author of presentation description 200, the date on which presentation description 200 was completed, and the number of content elements in presentation description 200.

Data related to the content elements of the presentation 210 can include a series of collections of data 225, 230, 235 that relate to individual content elements. For example, data collection 225 relates to a data element A, data collection 230 relates to a data element B, and data collection 235 relates to a data element C. Data collection 225 can include a title of element A 240, data that identifies element A 245, a description of element A 250, data that identifies a transcript that supplements element A 255, and a description of the transcript that supplements element A 260.

Data that identifies element A 245 can include, e.g., a filename, an extension, a graphic device such as an icon, and/or a memory location of element A such as, e.g., a uniform resource locator (URL) for element A. Description of element A 250 can include, e.g., the name of the author of element A and the date on which element A was completed. Data that identifies the transcript that supplements element A 255 can include, e.g., a filename, an extension, a graphic device such as an icon, and/or a memory location of the transcript. Description of the transcript that supplements element A 255 can include, e.g., the name of the author of the transcript, the date on which the transcript was completed, and the number of words in the transcript.

FIG. 3 shows an example presentation library 300. Presentation library 300 is a description of the presentations that are available to a data processing system (such as a presentation machine 105 of FIG. 1). Presentation library 300 can be presented to a user to allow the user to select a particular presentation for rendition, e.g., at presentation machine 105. Presentation library 300 can be generated using information contained in descriptions of presentations (such as presentation description 200 of FIG. 2).

Presentation library 300 includes a list of titles of presentations 305 and associated creation dates 310. Presentation library 300 can include a collection of related presentations 315, 320, 325, 330, 335. Presentations in a collection can be related, e.g., by purpose, format, author, or topic. For example, presentations 315, 320, 325, 330, 335 are related by a common purpose (i.e., educating a user) and a common topic (i.e., biology). Presentation library 300 can also include a list of authors of presentations 315, 320, 325, 330, 335 (not shown).

Figures 4, 5:
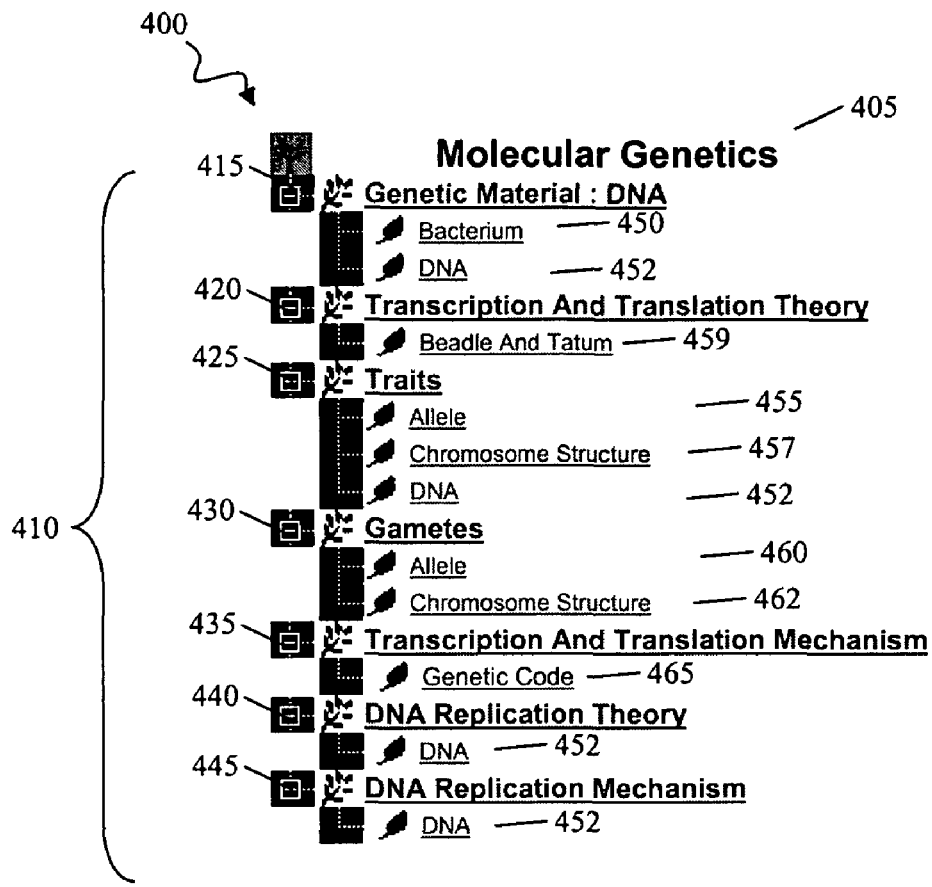
FIG. 4 shows an example user-readable representation of a presentation.
FIG. 5 shows an example library of content elements.

FIG. 4 shows an example user-readable representation of a presentation 400. Presentation representation 400 can interface with a user to provide the user with information regarding the sequence, content, and structure of the represented presentation. For example, presentation representation 400 can be displayed at an output device (such as a display of a presentation machine 105 of FIG. 1) to provide a user with information about a presentation (such as presentation description 200 of FIG. 2). In effect, presentation representation 400 can act as a user-readable translation of machine-readable presentation description 200.

Presentation representation 400 provides a user with a presentation title 405 and a presentation outline 410. Presentation outline 410 illustrates the hierarchical structure of the presentation entitled "Molecular Genetics" and includes a succession of content element titles 415, 420, 425, 430, 435, 440, 445 and content subelement titles 450, 452, 455, 457, 459, 460, 462, 465. In FIG. 4, the sequence of content elements in the presentation and organizational relationship between the content elements can be provided to a user by the sequence, font size, indentation, and other graphical manipulation of content element titles 415, 420, 425, 430, 435, 440, 445 and content subelement titles 450, 452, 455, 457, 459, 460, 462, 465. Also, a single content subelement can be a child to more than one content elements. For example, the content subelement denoted by title 452 can be a child to the content elements denoted by titles 415, 425, 440, and 445.

FIG. 5 shows an example library of content elements 500. Library 500 can be a user-readable representation of a collection of content elements displayed at an output device (such as a display of a presentation machine 105 of FIG. 1). Library 500 can include names 505, 510, 515, . . . of content elements. The content elements in library 500 can potentially be included in a presentation. The content elements in library 500 can be grouped according to a common characteristic and names 505, 510, 515, . . . can be indexed. For example, names 505, 510, 515, . . . are indexed in alphabetical order and the denoted content elements share a common subject, namely biology.

Figure 6:
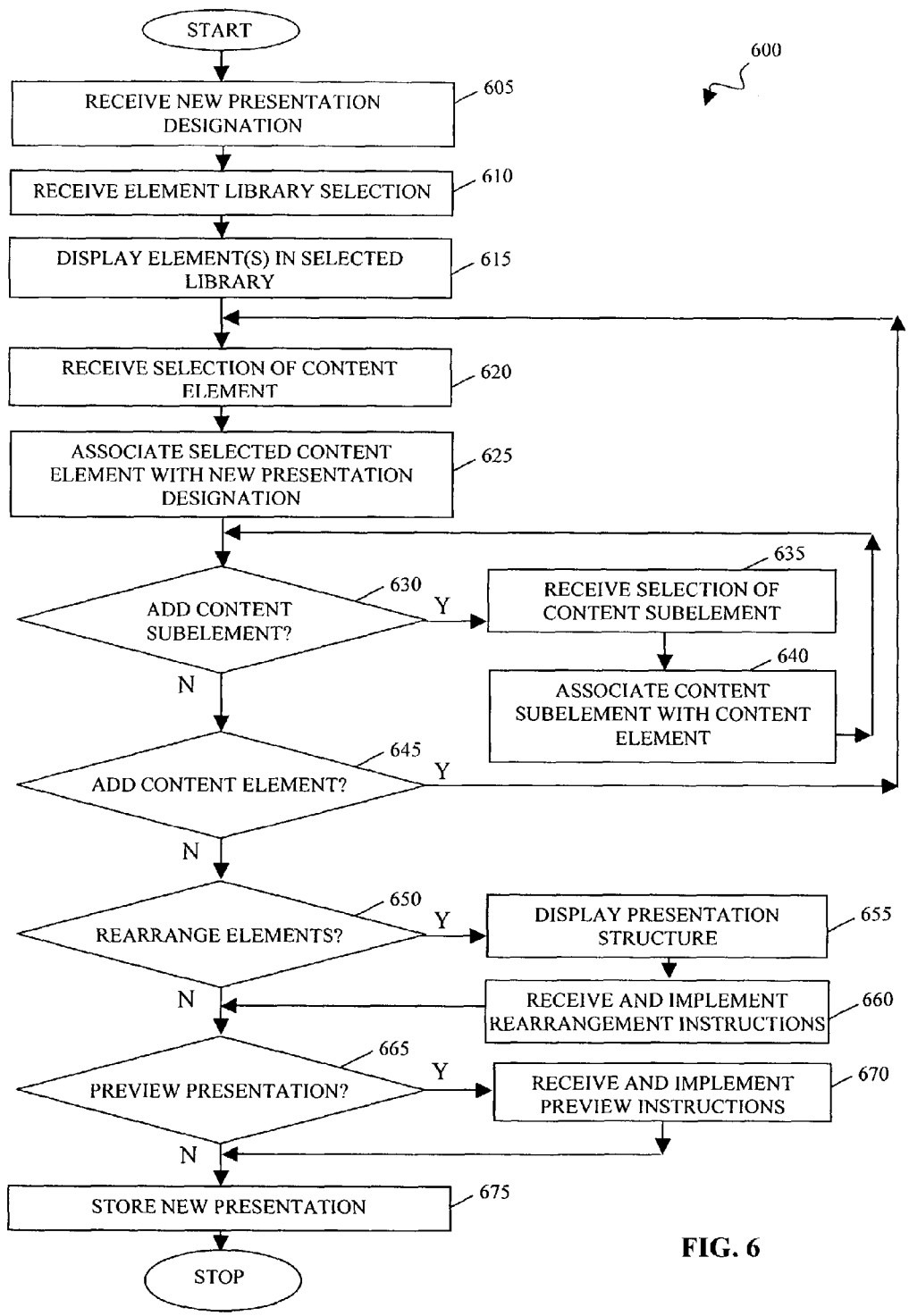
FIG. 6 shows a method for authoring a presentation.

FIG. 6 shows a method 600 for authoring a presentation. Method 600 can be performed by a data processing machine (such as authoring machine 110 of FIG. 1) for a user who is authoring a presentation. For example, a school teacher can author an educational presentation for students, or a salesperson can author a sales presentation for a sales audience.

The data processing machine performing method 600 first receives a designation of the new presentation (step 605). The designation can be a title, a reference number, a graphic device such as an icon, or other denominator that can be used to indicate the new presentation. The machine also receives a selection of one or more content element libraries (step 610) and then displays the element(s) in a selected library to a user (step 615). A content element library identifies elements that may be included in the new presentation. The selected library can include content elements that share a common characteristic and are indexed. For example, the machine can receive a selection indicating a content element library (such as library 500 in FIG. 5). The elements in a content element library can be displayed for a user at a display device (such as input/output devices 145 in FIG. 1).

The data processing machine performing method 600 receives a selection of a content element (step 620). The content element can be selected from a library of content elements previously selected in step 610. After receiving the content element selection, the machine associates the selected element with the designation of the new presentation (step 625). The machine can associate the selected content element with the designation by placing information identifying the selected content element into a data file or data structure that includes the new presentation designation. For example, the machine can associate a presentation title with an element identifier in a description of a presentation such as description 200 of FIG. 2.

When a presentation structure is hierarchical, the machine determines the desirability of the addition of a content subelement (decision 630). This can be done, e.g., by querying a user and receiving a response indicating the desirability of a subelement. As described above, a content subelement can be a content element with a relatively narrow or detailed scope that acts as a child to a content element with a broader or less detailed scope in a presentation hierarchy. When a content subelement is desired, the machine receives a selection of the desired subelement (step 635) and associates the content subelement with a previously selected element (step 640). The subelement can be associated with the previously selected element by placing information identifying the subelement into a data file that includes the information identifying the element, such as description 200 of FIG. 2.

The sequential selection of a subelement directly after the selection of a content element can indicate the structure of a presentation to the machine performing method 600. In particular, the selection order can indicate that the subsequently selected subelement is a child of the previously selected element in a hierarchical presentation structure. This indication of the structure of a presentation can be held immutable or subject to later change, as discussed below.

After a selected subelement is associated with an element, the machine returns to decision 630 and determines if another subelement is desirable. If not, the machine determines if an additional content element is desirable (decision 645). The machine can query a user and receive user input indicating the desirability of an additional content element. If desirable, the machine returns to step 620 to receive a selection of an additional content element. After receiving the additional selection, the machine associates the newly selected element with the designation of the new presentation, as well as the previously selected content element, in step 625.

The sequential selection of an additional content element after the selection of a content element can indicate the structure of a presentation to the machine performing method 600. In particular, the selection order can indicate that the subsequently selected element is to be rendered later than the previously selected element when the presentation is rendered.

The order and structure of the new presentation can be held immutable or subject to later change. In particular, the machine performing method 600 can determine if the elements of the presentation are to be rearranged within the structure of the presentation (decision 650). The determination of the desirability of rearrangement can be made by querying the user and receiving an affirmation of the desirability of rearrangement. If desirable, the machine performing method 600 displays the current presentation structure (step 655) receives and implements rearrangement instructions (step 660). The rearrangement of elements can include adding or deleting content elements, resequencing the order of elements, or repositioning elements within the presentation structure. For example, a subelement that is the child of a first content element can be made the child of a second content element. Rearrangement instructions can be received from a user (over input devices such as input/output devices 145 of FIG. 1).

The machine performing method 600 can also determine if the presentation is to be previewed (step 665). The desirability of preview can be determined by querying the user and receiving an affirmation of the desirability of a preview of the presentation. If desirable, the machine performing method 600 receives and implements instructions for previewing the current presentation (step 670). The presentation can be previewed by rendering the presentation (for example, using method 900 in FIG. 9, as discussed below).

The machine performing method 600 can also store the newly authored presentation (step 675). For example, the machine can record a file or data structure that describes the new presentation (such as presentation description 200 of FIG. 2) at a data storage device (such as data storage device 130 of FIG. 1).

Figure 7:
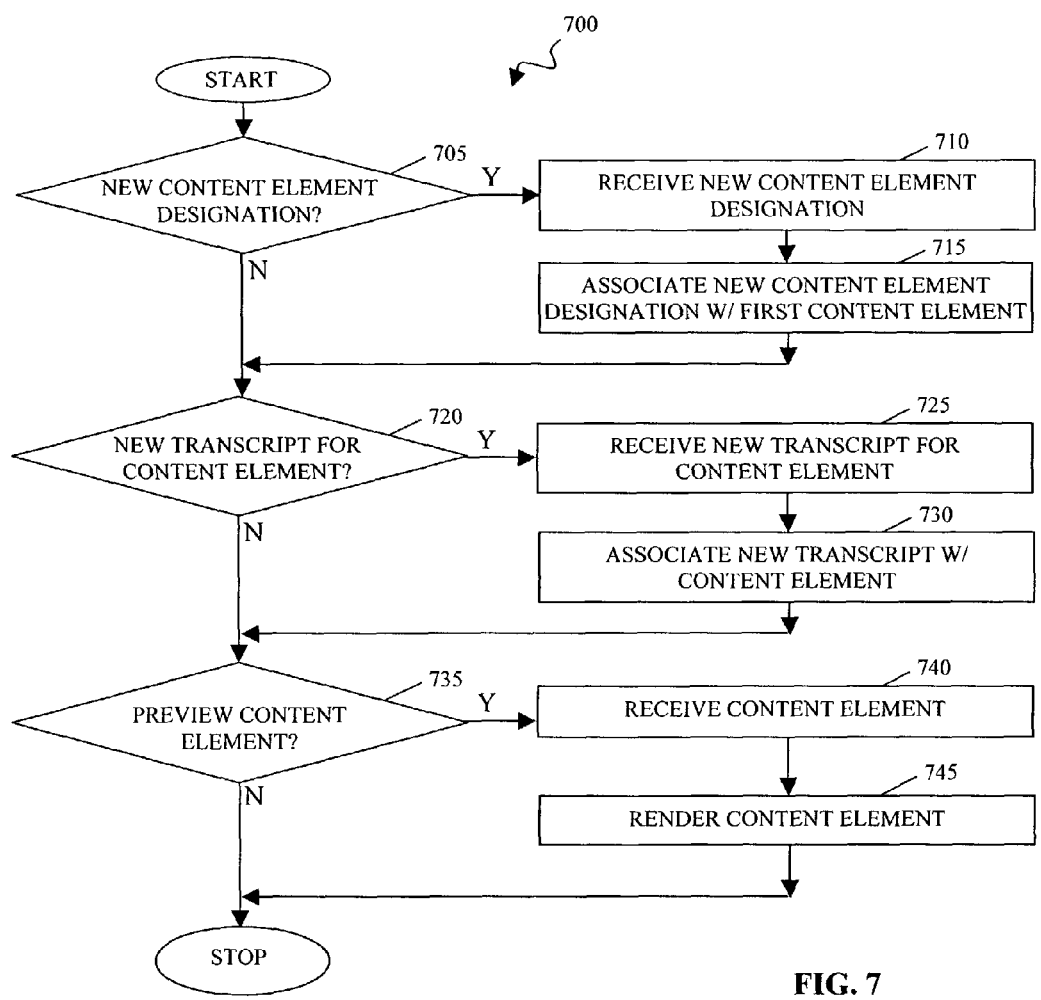
FIG. 7 shows a method for customizing a content element.

FIG. 7 shows a method 700 for customizing a content element. Method 700 can be performed when associating a preexisting content element with a new presentation (such as in step 625 of FIG. 6), when a new content element is prepared for addition to a content element library (such as library 500 of FIG. 5), or when a preexisting presentation is edited.

A data processing machine performing method 700 determines if a new designation for the content element is desirable (decision 705). The machine can determine the desirability of a new designation by querying a user regarding a change an existing designation or, without user input, by examining an existing designation and determining the existing designation's suitability in light of a predefined standard. If the machine determines that a new designation is desirable, then the machine receives a new designation (step 710) and associates the new designation with the content element (step 715). The new designation can be associated with the content element by renaming the content element or creating a table or other data structure that relates the new designation to an existing designation or other information that identifies the content element.

The data processing machine performing method 700 also determines if a new transcript is desirable for the content element (decision 720). The machine can determine the desirability of a new transcript by querying a user regarding a new transcript or by examining the sufficiency of an existing transcript in light of a predefined standard. The new transcript can be an additional transcript or the new transcript can replace an existing transcript. If the machine determines that a new transcript is desirable, then the machine receives the new transcript (step 725) and associates the new transcript with the content element (step 730). The new transcript can be associated with the content element by adding information that identifies the new transcript to a data structure that includes information that identifies the content element (such as presentation 200 of FIG. 2).

The data processing machine performing method 700 also determines if a preview of the content element is desirable (decision 735). The machine can determine the desirability of a preview of the content element by querying a user regarding the desirability of a preview. If a preview is desired, then the machine receives the content element (step 740) and renders the content element (step 745). The content element can be received by receiving streaming content from a remote data processing system. The content element can be rendered on a video display, using an audio output device, or as otherwise warranted.

Figure 8:
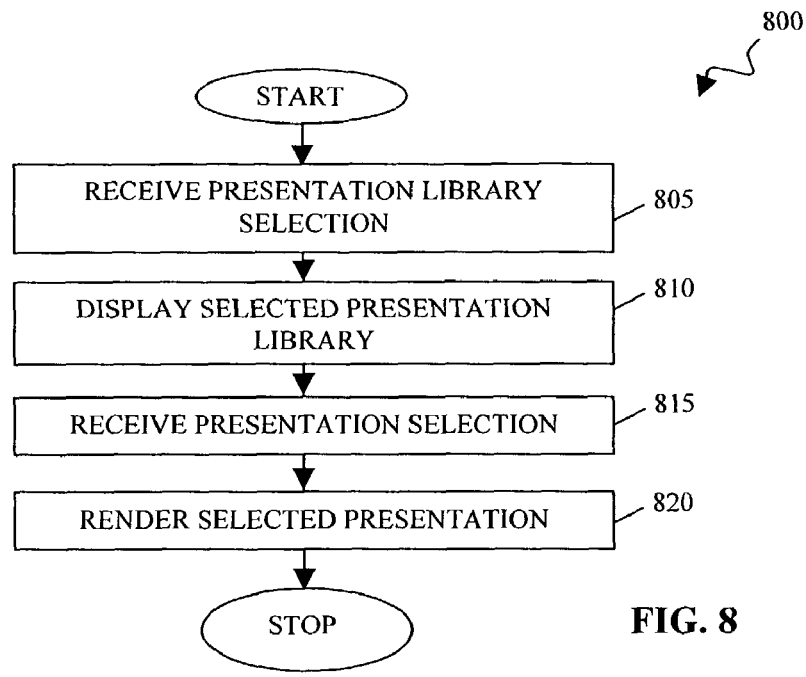
FIG. 8 shows a method for rendering a presentation.

FIG. 8 shows a method 800 for rendering a presentation. Method 800 can be performed by a data processing machine such as presentation machine 105 of FIG. 1.

The machine performing method 800 can receive a selection indicating a presentation library (step 805). For example, the machine can display a list of presentation libraries to a user and receive user input identifying one of the displayed libraries. The machine can then display the presentation library (step 810) by describing the presentations in the library to a user. For example, the machine can display presentation library 300 of FIG. 3 to a user at presentation machine 105 of FIG. 1.

The machine performing method 800 can also receive a selection of a presentation in the displayed presentation library (step 815) and then render the selected presentation for a user (step 820). The selected presentation can be rendered in accordance with the nature of the content elements, the sequence of the content elements in the presentation, and the structure of the presentation. For example, audio elements of a presentation can be rendered by playing the audio content on a speaker, while video elements can be rendered by displaying the video on a video display device. A transcript of an element can be displayed while rendering the element. Content elements can be rendered in sequence, with or without user prompting to commence rendition or to transition between elements. Alternatively, content elements can be rendered in a sequence received from the user for whom the presentation is rendered, rather than in a sequence provided by the author of the presentation.

Figure 9:
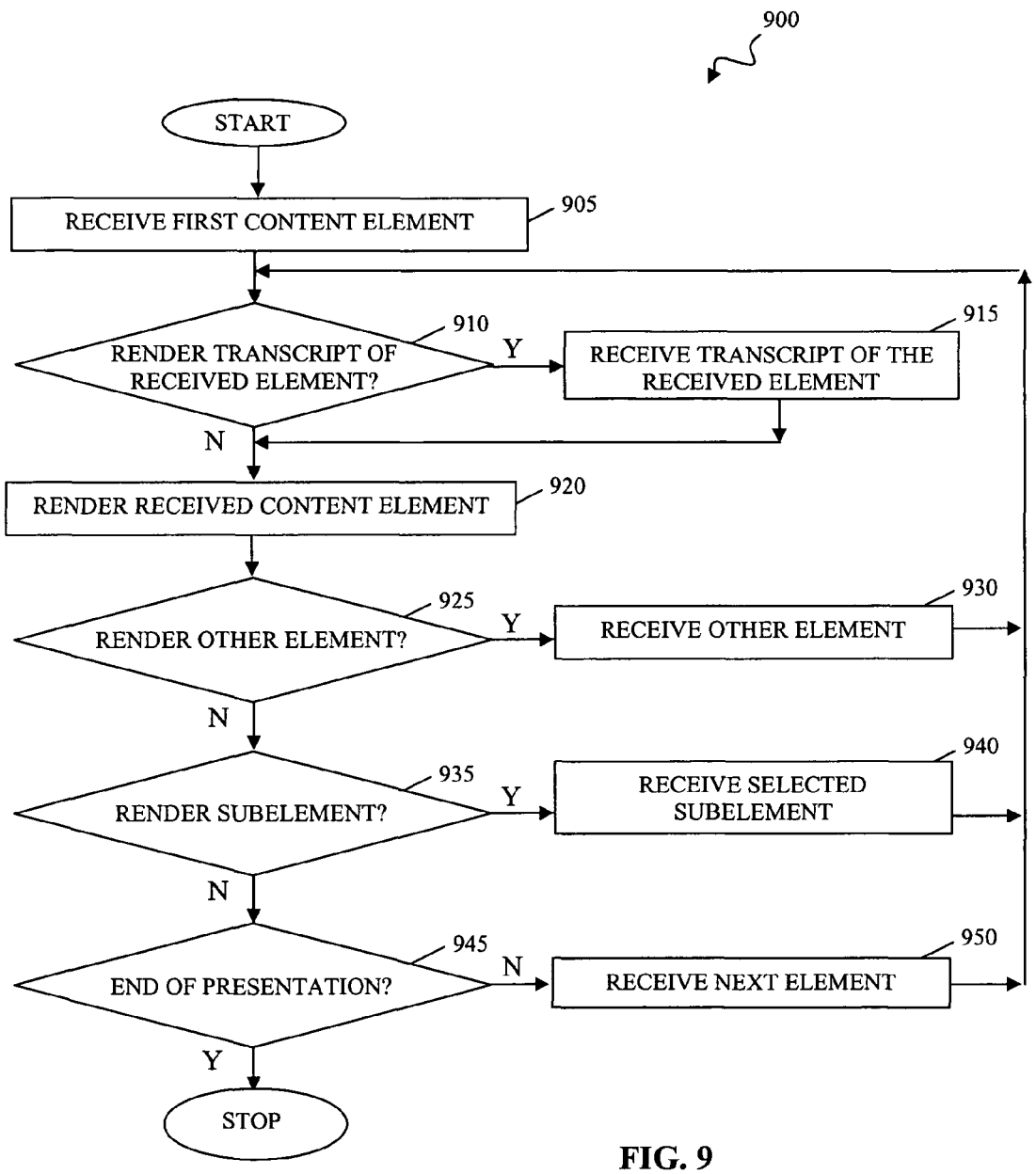
FIG. 9 shows a method for rendering a presentation with a hierarchical structure.

FIG. 9 shows a method 900 for rendering a presentation with a hierarchical structure (such as presentation 400 of FIG. 4). Method 900 can be performed by a data processing machine such as presentation machine 105 of FIG. 1.

The machine performing method 900 can receive the first content element in a presentation (step 905). For example, in presentation 400 of FIG. 4, content element 415 entitled "Genetic Material:DNA" is the first content element. The content element can be received from a remote location thereby minimizing the local data storage needs at the rendering machine. The content element can be received as streaming content, as discussed above.

The machine performing method 900 can also determine if a transcript for the content element is also to be rendered (decision 910). For example, the desirability of the rendition of a transcript can be determined, without user input, based on the availability of a transcript or based on a user's response to a query regarding the desirability of the rendition of the transcript. If it is determined that the rendition of a transcript is desirable, then the transcript of the received element is also received (step 915). The machine can render the received content element alone or along with a received transcript (step 920).

When rendering a hierarchical presentation, the machine performing method 900 can also determine if the rendition of an alternate element of the presentation is desired (decision 925). The machine can make this determination based upon user input that identifies an alternate element in the presentation. For example, the machine performing method 900 can display a description of the presentation (such as presentation 400 of FIG. 4) and receive user input (such as a mouse click) that identifies the alternate element. If the rendition of an alternate element is desired, then the machine receives the alternate element (step 930) and returns to decision 910 to determine if rendition of the transcript of the alternate element is desirable.

When rendering a hierarchical presentation, the machine performing method 900 can also determine if the rendition of a subelement is desired (decision 935). The subelement can be a subelement of the received element or the subelement of another element in the presentation. The machine can determine if the rendition of a subelement is desirable based upon user input that identifies a subelement in the presentation. For example, the machine performing method 900 can display a description of the presentation (such as presentation 400 of FIG. 4) and receive user input (such as a mouse click) that identifies a subelement. If the rendition of a subelement is desired, then the machine receives the subelement (step 940) and returns to decision 910 to determine if rendition of the transcript of the subelement is desirable.

After rendition of any received content element is complete, the machine performing method 900 determines if the presentation has ended (decision 945). The machine can determine if the presentation has ended by receiving user input terminating the presentation or by determining if the completely rendered element is the last element in the presentation. For example, in presentation 400 of FIG. 4, content element 445 entitled "DNA Replication Mechanism" is the last content element. If the machine determines that the presentation has not ended, then the machine receives the next content element in the presentation (step 950) and returns to decision 910 to determine if rendition of the transcript of the subelement is desirable. The next content element can be identified from user input or determined from the sequence of content elements in the presentation structure. For example, in presentation 400 of FIG. 4, content element 420 entitled "Transcription And Translation Theory" can be the next content element after content element 415 entitled "Genetic Material:DNA."

Figure 10:
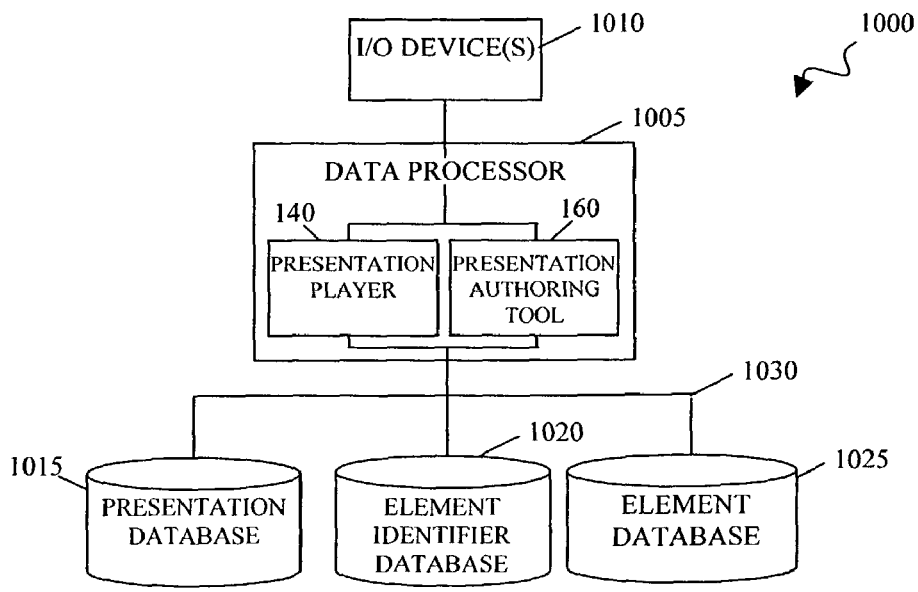
FIG. 10 shows another example of a data processing environment.

FIG. 10 shows another example of a data processing environment, namely data processing environment 1000. Environment 1000 includes a data processor 1005, one or more input/output devices 1010, data repositories 1015, 1020, 1025, and a data link 1030. Data processor 1005 can performs processing activities that result in both presentation player 140 and presentation authoring tool 160.

Data repository 1015 can store a library of descriptions of presentations. Data repository 1020 can be an element identifier database that identifies potential content elements of presentations. Data repository 1025 can be a presentation element database that stores various content elements suitable for inclusion in the rendition of a presentation. For example, data repository 1025 can include streaming content elements. Data repositories 1015, 1020, 1025 can be physically located on a single data storage device or on multiple or distributed data storage devices. Thus, data link 1030 can be a data transmission network, a bus in a single data processing device, or a combination thereof.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language.

As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the environment can be interconnected by any form or medium of digital data communication (e.g., a communication network). Examples of communication networks include a local area network ("LAN"), a wide area network ("WAN"), and the Internet.

A data processing environment can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, other presentation structures and additional rules constraining presentation structures can be used. For example, a rule constraining every element of a presentation to have a subelement can be implemented. Such rules can be reflected in the systems and techniques described herein. For example, a rule constraining every element to have at least one subelement can be reflected in method 600 by additional steps directed to receiving a selection of at least one content subelement for every content element. Accordingly, other implementations are within the scope of the following claims.

The invention claimed is:

1. An article comprising a machine-readable medium storing instructions operable to cause one or more machines to perform operations comprising:
   receiving a presentation description identifying two separate streaming content elements and a presentation sequence of the two elements;
   receiving the two separate streaming content elements from two or more remote locations; and
   rendering the two separate streaming content elements in the presentation sequence without prompting from a user, wherein each content element comprises a distinct machine-readable representation of information.

2. The article of claim 1, wherein rendering the two separate streaming content elements in the presentation sequence comprises rendering the second of the two streaming content elements immediately after conclusion of the first of the two streaming content elements.

3. The article of claim 1, wherein receiving the presentation description comprises receiving the presentation description identifying a third streaming content element, the third streaming content element being a child of the first of the two streaming content elements.

4. The article of claim 1, wherein rendering the two separate streaming content elements in the presentation sequence comprises rendering the two separate streaming content elements in the presentation sequence without rendering a third streaming content element.

5. The article of claim 1, further comprising:
receiving a user selection of a third content element while rendering the first of the two streaming content elements; and
rendering the third content element prior to rendering the second of the two streaming content elements.

6. The article of claim 1, wherein receiving the presentation description comprises receiving a file identifying the two separate streaming content elements by name and identifying the presentation sequence of the two elements by the sequence of the names in the file.

7. The article of claim 1, wherein rendering the two streaming content elements comprises rendering a text supplement of the two streaming content elements.

8. The article of claim 7, wherein rendering the text supplement comprises rendering a transcript of one of the two streaming content elements.

9. An article comprising a machine-readable medium storing instructions operable to cause one or more machines to perform operations comprising:
receiving a description of a hierarchical presentation describing a collection of streaming content elements potentially to be displayed during a rendition of the presentation;
rearranging an organization of the streaming content elements in the description of the hierarchical presentation;
determining whether or not to render a first streaming content element in the collection; and
receiving and rendering the first streaming content element only when it is determined to render the first streaming content element,
wherein each content element comprises a distinct machine-readable representation of information.

10. The article of claim 9, wherein the operations further comprise:
providing a user-readable translation of the description of the presentation to a user; and
determining whether or not to render the first streaming content element based on user interaction with the user-readable translation.

11. The article of claim 9, wherein receiving the description of the presentation comprises receiving information identifying a remote streaming content element.

12. The article of claim 9, wherein receiving the description of the presentation comprises:
receiving the description of the presentation from a first remote data processing machine; and
receiving information identifying the remote streaming content element at a second remote data processing machine.

13. The article of claim 9, wherein determining whether or not to render a first streaming content element comprises receiving user input selecting the first streaming content element.

14. The article of claim 9, wherein determining whether or not to render a first streaming content element comprises receiving user input bypassing the first streaming content element.

15. The article of claim 9, wherein determining whether or not to render the first streaming content element comprises identifying the first streaming content element as a parent content element or as a child content element in the hierarchical presentation.

16. The article of claim 15, wherein determining whether or not to render the first streaming content element comprises rendering a parent streaming content element after a rendition of a prior content element.

17. The article of claim 9, wherein:
determining whether or not to render the first streaming content element comprises receiving user input indicating a child first streaming content element; and
receiving and rendering the first streaming content element comprises receiving and rendering the child first streaming content element only upon receipt of the user input indicating the child first streaming content element.

18. The article of claim 9, wherein receiving the description of the presentation comprises receiving a description of a transcript supplementing one streaming content element from the collection.

19. The article of claim 9, wherein receiving the description of the presentation comprises receiving a description of an educational lesson.

20. The article of claim 9, wherein receiving the description of the presentation comprises receiving a description of a sales pitch.

21. The article of claim 9, wherein rearranging the organization of the streaming content elements comprises resequencing the streaming content elements in the hierarchical description of the presentation.

* * * * *